(12) United States Patent
Thorstensen-Woll (10) Patent No.: US 9,193,513 B2
(45) Date of Patent: Nov. 24, 2015

(54) TABBED INNER SEAL (75) Inventor: Robert William Thorstensen-Woll, Barrie (CA)

(73) Assignee: SELIG SEALING PRODUCTS, INC., Forrest, IL (US)

( * ) Notice: Subject to any disclaimer, the term of this patent is extended or adjusted under 35 U.S.C. 154(b) by 495 days.

(21) Appl. No.: 13/604,259

(22) Filed: Sep. 5, 2012

(65) Prior Publication Data

US 2014/0061197 A1 Mar. 6, 2014

(51) Int. Cl.
*B65D 17/34* (2006.01)
*B65D 77/20* (2006.01)
*B32B 7/04* (2006.01)

(52) U.S. Cl.
CPC ............. *B65D 77/2024* (2013.01); *B32B 7/04* (2013.01); *B32B 7/045* (2013.01); *B65D 2577/205* (2013.01)

(58) Field of Classification Search
CPC .... B65D 17/501; B65D 41/045; B65D 51/20; B65D 77/2024; B65D 2251/0015; B65D 2251/0093; B32B 15/00; B32B 15/04; B32B 15/046; B32B 15/08; B32B 27/00; B32B 27/08; B32B 27/32; B32B 27/36; B23B 7/04; B23B 7/045
USPC .................... 215/232, 329, 341, 347, DIG. 2; 220/359.1–359.4
See application file for complete search history.

(56) References Cited

U.S. PATENT DOCUMENTS

| | | | |
|---|---|---|---|
| 2,768,762 A | 10/1956 | Guinet | |
| 3,235,165 A | 2/1966 | Jackson | |
| 3,292,828 A | 12/1966 | Stuart | |
| 3,302,818 A | 2/1967 | Balocca et al. | |
| 3,460,310 A | 8/1969 | Adcock et al. | |
| 3,990,603 A | 11/1976 | Brochman | |
| 4,133,796 A | 1/1979 | Bullman | |
| 4,206,165 A | 6/1980 | Dukess | |
| 4,582,735 A | 4/1986 | Smith | |
| 4,588,099 A | 5/1986 | Diez | |
| 4,596,338 A * | 6/1986 | Yousif | 215/232 |
| 4,636,273 A | 1/1987 | Wolfersperger | |

(Continued)

FOREIGN PATENT DOCUMENTS

AT 501 393 A1 8/2006
AT 11 738 U1 4/2011

(Continued)

OTHER PUBLICATIONS

PCT International Search Report and Written Opinion of the International Searching Authority dated Sep. 21, 2012 for International Application PCT/US2012/043568, 14 pages.

(Continued)

*Primary Examiner* — Bryon Gehman
*Assistant Examiner* — Brijesh V. Patel
(74) *Attorney, Agent, or Firm* — Fitch, Even, Tabin & Flannery LLP (57) ABSTRACT

A pull-tab sealing member for a container is provided combining the advantages of an insulation or foamed polymer layer for effective heat sealing together with an overall laminate structure having a higher internal strength even with the use of the foamed polymer layer. The sealing members herein are capable of withstanding higher removal forces by repositioning an internal stress point within the seal laminate structure.

11 Claims, 4 Drawing Sheets

(56) References Cited

U.S. PATENT DOCUMENTS

| | | |
|---|---|---|
| 4,666,052 A | 5/1987 | Ou-Yang |
| 4,735,335 A | 4/1988 | Torterotot |
| 4,741,791 A | 5/1988 | Howard et al. |
| 4,770,325 A | 9/1988 | Gordon et al. |
| 4,801,647 A | 1/1989 | Wolfe, Jr. |
| 4,811,856 A | 3/1989 | Fischman |
| 4,837,061 A | 6/1989 | Smits et al. |
| 4,960,216 A | 10/1990 | Giles et al. |
| 4,961,986 A | 10/1990 | Galda |
| 5,004,111 A | 4/1991 | McCarthy |
| 5,015,318 A | 5/1991 | Smits et al. |
| 5,055,150 A | 10/1991 | Rosenfeld et al. |
| 5,057,365 A | 10/1991 | Finkelstein et al. |
| 5,071,710 A | 12/1991 | Smits et al. |
| 5,098,495 A | 3/1992 | Smits et al. |
| RE33,893 E | 4/1992 | Elias et al. |
| 5,125,529 A | 6/1992 | Torterotot |
| 5,149,386 A | 9/1992 | Smits et al. |
| 5,178,967 A | 1/1993 | Rosenfeld et al. |
| 5,197,618 A | 3/1993 | Goth |
| 5,265,745 A | 11/1993 | Pereyra et al. |
| 5,433,992 A | 7/1995 | Galda et al. |
| 5,513,781 A | 5/1996 | Ullrich et al. |
| 5,514,442 A | 5/1996 | Galda et al. |
| 5,598,940 A | 2/1997 | Finkelstein et al. |
| 5,601,200 A | 2/1997 | Finkelstein et al. |
| 5,615,789 A | 4/1997 | Finkelstein et al. |
| 5,669,521 A | 9/1997 | Wiening et al. |
| 5,702,015 A | 12/1997 | Giles et al. |
| 5,860,544 A | 1/1999 | Brucker |
| 5,871,112 A | 2/1999 | Giles |
| 5,915,577 A | 6/1999 | Levine |
| 5,975,304 A | 11/1999 | Cain et al. |
| 6,082,566 A | 7/2000 | Yousif et al. |
| 6,096,358 A | 8/2000 | Murdick |
| 6,131,754 A | 10/2000 | Smelko |
| 6,139,931 A | 10/2000 | Finkelstein et al. |
| 6,158,632 A | 12/2000 | Ekkert |
| 6,194,042 B1 | 2/2001 | Finkelstein et al. |
| 6,312,776 B1 | 11/2001 | Finkelstein et al. |
| 6,378,715 B1 | 4/2002 | Finkelstein et al. |
| 6,458,302 B1 | 10/2002 | Shifflet |
| 6,602,309 B2 | 8/2003 | Vizulis et al. |
| 6,627,273 B2 | 9/2003 | Wolf et al. |
| 6,699,566 B2 | 3/2004 | Zeiter et al. |
| 6,705,467 B1 | 3/2004 | Kancsar et al. |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko et al. |
| 6,902,075 B2 | 6/2005 | O'Brien et al. |
| 6,916,516 B1 | 7/2005 | Gerber et al. |
| 6,955,736 B2 | 10/2005 | Rosenberger et al. |
| 6,974,045 B1 | 12/2005 | Trombach et al. |
| 7,128,210 B2 | 10/2006 | Razeti et al. |
| 7,182,475 B2 | 2/2007 | Kramer et al. |
| 7,217,454 B2 | 5/2007 | Smelko et al. |
| RE39,790 E | 8/2007 | Fuchs et al. |
| 7,316,760 B2 | 1/2008 | Nageli |
| 7,448,153 B2 | 11/2008 | Maliner et al. |
| 7,531,228 B2 | 5/2009 | Perre et al. |
| 7,648,764 B2 | 1/2010 | Yousif |
| 7,713,605 B2 | 5/2010 | Yousif et al. |
| 7,740,730 B2 | 6/2010 | Schedl et al. |
| 7,740,927 B2 | 6/2010 | Yousif et al. |
| 7,798,359 B1 | 9/2010 | Marsella |
| 7,819,266 B2 | 10/2010 | Ross et al. |
| 7,838,109 B2 | 11/2010 | Declerck |
| 7,850,033 B2 | 12/2010 | Thorstensen-Woll |
| 8,057,896 B2 | 11/2011 | Smelko et al. |
| 8,329,288 B2 | 12/2012 | Allegaert et al. |
| 8,348,082 B2 | 1/2013 | Cain |
| 2002/0068140 A1 | 6/2002 | Finkelstein et al. |
| 2003/0168423 A1 | 9/2003 | Williams |
| 2004/0043238 A1* | 3/2004 | Wuest et al. ............ 428/515 |
| 2004/0109963 A1 | 6/2004 | Zaggia et al. |
| 2005/0048307 A1 | 3/2005 | Schubert et al. |
| 2005/0208242 A1 | 9/2005 | Smelko |
| 2006/0000545 A1 | 1/2006 | Nageli et al. |
| 2006/0003120 A1 | 1/2006 | Nageli et al. |
| 2006/0003122 A1 | 1/2006 | Nageli et al. |
| 2006/0151415 A1 | 7/2006 | Smelko et al. |
| 2006/0278665 A1 | 12/2006 | Bennett |
| 2007/0003725 A1 | 1/2007 | Yousif |
| 2007/0065609 A1 | 3/2007 | Korson |
| 2007/0267304 A1 | 11/2007 | Portier |
| 2007/0298273 A1 | 12/2007 | Thies et al. |
| 2008/0026171 A1 | 1/2008 | Gullick et al. |
| 2008/0073308 A1 | 3/2008 | Yousif |
| 2008/0103262 A1 | 5/2008 | Haschke |
| 2008/0156443 A1 | 7/2008 | Schaefer et al. |
| 2008/0169286 A1 | 7/2008 | McLean et al. |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll et al. |
| 2009/0078671 A1 | 3/2009 | Triquet et al. |
| 2009/0208729 A1 | 8/2009 | Allegaert et al. |
| 2009/0304964 A1 | 12/2009 | Sachs et al. |
| 2010/0009162 A1 | 1/2010 | Rothweiler |
| 2010/0030180 A1 | 2/2010 | Declerck |
| 2010/0047552 A1 | 2/2010 | McLean et al. |
| 2010/0059942 A1 | 3/2010 | Rothweiler |
| 2010/0116410 A1 | 5/2010 | Yousif |
| 2010/0155288 A1 | 6/2010 | Harper et al. |
| 2010/0170820 A1 | 7/2010 | Leplatois et al. |
| 2010/0193463 A1 | 8/2010 | O'Brien et al. |
| 2010/0213193 A1 | 8/2010 | Helmlinger et al. |
| 2010/0221483 A1 | 9/2010 | Gonzalez Carro et al. |
| 2010/0290663 A1 | 11/2010 | Trassl et al. |
| 2010/0314278 A1 | 12/2010 | Fonteyne et al. |
| 2011/0000917 A1 | 1/2011 | Wolters et al. |
| 2011/0005961 A1 | 1/2011 | Leplatois et al. |
| 2011/0089177 A1 | 4/2011 | Thorstensen-Woll |
| 2011/0091715 A1 | 4/2011 | Rakutt et al. |
| 2011/0100949 A1 | 5/2011 | Grayer et al. |
| 2011/0100989 A1 | 5/2011 | Cain |
| 2011/0138742 A1 | 6/2011 | McLean |
| 2011/0147353 A1 | 6/2011 | Kornfeld et al. |
| 2012/0000910 A1 | 1/2012 | Ekkert |
| 2012/0043330 A1 | 2/2012 | McLean et al. |
| 2012/0067896 A1* | 3/2012 | Daffner et al. ............ 220/359.3 |
| 2012/0103988 A1 | 5/2012 | Wiening |
| 2012/0111758 A1 | 5/2012 | Lo |
| 2012/0241449 A1 | 9/2012 | Frischmann et al. |
| 2013/0020324 A1* | 1/2013 | Thorstensen-Woll et al. ............ 220/270 |
| 2014/0061196 A1* | 3/2014 | Thorstensen-Woll ........ 220/270 |
| 2014/0186589 A1* | 7/2014 | Chang ............ 428/189 |

FOREIGN PATENT DOCUMENTS

| | | |
|---|---|---|
| BR | 8200231 U | 9/2003 |
| BR | 0300992 A | 11/2004 |
| CA | 2 015 992 A1 | 1/1991 |
| DE | 102 04 281 A1 | 8/2003 |
| DE | 10 2006 030 118 B3 | 5/2007 |
| DE | 10 2007 022 935 B4 | 4/2009 |
| DE | 20 2009 000 245 U1 | 4/2009 |
| EP | 0 668 221 A1 | 8/1995 |
| EP | 0 826 598 A2 | 3/1998 |
| EP | 0 826 599 A2 | 3/1998 |
| EP | 0 717 710 B1 | 4/1999 |
| EP | 0 915 026 A1 | 5/1999 |
| EP | 0 706 473 B1 | 8/1999 |
| EP | 1075921 | 2/2001 |
| EP | 0 803 445 B1 | 11/2003 |
| EP | 1 462 381 A1 | 9/2004 |
| EP | 1199253 B1 | 3/2005 |
| EP | 1 577 226 A1 | 9/2005 |
| EP | 1 814 744 A1 | 8/2007 |
| EP | 1 834 893 A1 | 9/2007 |
| EP | 1837288 A1 | 9/2007 |
| EP | 1 839 898 A1 | 10/2007 |
| EP | 1 839 899 A1 | 10/2007 |

(56) References Cited

FOREIGN PATENT DOCUMENTS

| | | |
|---|---|---|
| EP | 1 857 275 A1 | 11/2007 |
| EP | 1 873 078 A1 | 1/2008 |
| EP | 1 445 209 B1 | 5/2008 |
| EP | 1 918 094 A1 | 5/2008 |
| EP | 1 968 020 A1 | 9/2008 |
| EP | 1 992 476 A1 | 11/2008 |
| EP | 2 230 190 A1 | 9/2010 |
| EP | 2 292 524 A1 | 3/2011 |
| FR | 2 916 157 A1 | 11/2008 |
| FR | 2 943 322 A1 | 9/2010 |
| KR | 10-0711073 B1 | 4/2007 |
| KR | 10-0840926 B1 | 6/2008 |
| KR | 10-0886955 B1 | 3/2009 |
| MX | PA05002905 A | 2/2006 |
| MX | 2010001867 A | 4/2010 |
| WO | 9905041 A1 | 2/1999 |
| WO | 00/66450 A1 | 11/2000 |
| WO | 2006/018556 A1 | 2/2006 |
| WO | 2006/021291 A1 | 3/2006 |
| WO | 2006073777 A1 | 7/2006 |
| WO | 2006108853 A1 | 10/2006 |
| WO | 2008/027029 A2 | 3/2008 |
| WO | 2008/027036 A1 | 3/2008 |
| WO | 2008/039350 A2 | 4/2008 |
| WO | 2008/125784 A1 | 10/2008 |
| WO | 2008/125785 A1 | 10/2008 |
| WO | 2008/148176 A1 | 12/2008 |
| WO | 2009/092066 A2 | 7/2009 |
| WO | 2010/115811 A1 | 10/2010 |
| WO | 2011/039067 A1 | 4/2011 |
| WO | 2012/079971 A1 | 6/2012 |
| WO | 2012/113530 A1 | 8/2012 |
| WO | 2012/152622 A1 | 11/2012 |
| WO | 2012/172029 A1 | 12/2012 |

OTHER PUBLICATIONS

Declaration of Robert William Thorstensen-Woll Under 37 C.F.R. § 1.132 executed on May 2, 2011 for U.S. Appl. No. 11/030,275, 20 pages.
United Kingdom Intellectual Property Office Combined Search and Examination Report under Sections 17 and 18(3) for Application No. GB1302295.9 dated May 1, 2013, 6 pages.
International Search Report and Written Opinion in International Application No. PCT/US13/57255, dated Dec. 5, 2013, 12 pages.

* cited by examiner

TABBED INNER SEAL

FIELD

The disclosure relates to a pull-tab sealing member for closing the mouth of a container, and more particularly, to a pull-tab sealing member having a foamed polymer layer therein.

BACKGROUND

It is often desirable to seal the opening of a bottle, jar or other container opening using a sealing member or inner seal to maintain freshness and/or to indicate whether the container has been tampered with. Often a cap or other closure is then screwed or placed on the neck or other container opening. In use, a consumer typically removes the cap or other closure to gain access to the seal and removes or otherwise peels the seal from the container in order to dispense or gain access to its contents.

Initial attempts at sealing a container opening included an induction- or conduction-type inner seal covering the container's opening where the seal generally conformed to the shape of the opening such that a circular container opening was sealed with a round disk approximately the same size as the opening. These prior seals commonly had a lower heat activated sealing layer to secure a periphery of the seal to a rim or upper surface surrounding a container's opening. Upon exposing the seal to heat, the lower layer bonds to the container rim. In many cases, these seals included a foil layer to provide induction heat to activate the lower heat seal layer. These prior seals tended to provide good sealing, but can be difficult for a consumer to remove because there was nothing for the consumer to grab in order to remove the seal. Often, the consumer needed to pick at the seal's edge with a fingernail because there was little or no seal material to grasp.

Other types of seals for containers include a side tab or other flange that extends outwardly from a peripheral edge of the seal. These side tabs are generally not secured to the container rim and provide a grasping surface for a consumer to hold and peel off the seal. These side tabs, however, extend over the side of the container rim and often protrude into a threaded portion of the closure. If the side tab is too large, this configuration may negatively affect the ability of the seal to form a good seal. The side tabs (and often the seal itself) can be deformed or wrinkled when the closure or other cap is placed on the container due to contact between the closure and tabbed part of the seal. To minimize these concerns, the side tabs are often very small; thus, providing little surface area or material for a consumer to grasp in order to remove the seal.

Yet other types of seals include a sealing member having a tab defined on the top of the seal. One approach of these prior seals includes a partial layer of coated pressure sensitive adhesive to secure the tab to a layer of metal foil. This type of top-tabbed seal offers the advantage of a larger tab, which provides more grasping area for the consumer to hold and peel off the seal. These seals, however, have a non-uniform cross-section between the tabbed and non-tabbed sides of the seal because of the part layer of pressure sensitive adhesive. This non-uniform cross-section tends to cause problems when heat sealing to the container via an induction or conduction process. If sufficient heat is applied to activate the lower heat activated sealing layer on the tabbed side of the seal, then due to the additional layers on the non-tabbed side of the seal (i.e., the additional adhesive layer), the non-tabbed side often does not receive enough heat to adequately bond to the container. Conversely, if additional heating is applied in order to insure that both sides of the seal receive sufficient heat for bonding to the container rim, then the tabbed side of the seal often receives too much heat resulting in too strong of a bond to the container. If a portion of the lower heat activated sealing layer is bonded to the container too strongly, this heat-seal/container bond can exceed the bond strength of the adhesive holding the tab to the lower seal layers or even the tear strength of the tab material itself. This undesirable situation can result in the tab tearing or the tab separating from the lower seal layers upon a consumer using the tab to remove the seal. In other approaches, the seal may include a part paper or polymer layer forming the tab. This part layer may also form a non-uniform seal between the tabbed and non-tabbed sides. The part layer tends to provide extra insulation, which also leads to non-uniform heat seal bonding between the tabbed and non-tabbed sides of the seal.

Some top-tabbed-type seals may further include a foam layer in the lower seal portion positioned on top of any foil layer and under the tab to try and retain uniform heat between the tabbed and non-tabbed side of the seal even when the seal has a non-uniform cross-section. In these prior seals, the foam layer is advantageous in the lower seal laminate under the tab because it not only helps provide uniform heating to both sides of the lower heat seal layer, but with its close proximity to the foil, it further helps insulate and protect the upper layers and tab from damage or melting due to the heat experienced by the seal during heat sealing. In particular, the foam layer of these prior seals helps protect the adhesive layer that secures the tab to the lower seal laminate in these prior seals. Often, the adhesive layer used to secure the tab to the lower layers is also a heat activated adhesive layer rather than the pressure sensitive adhesive mentioned above. The heat activated adhesive layer has a lower melt point that renders it susceptible to melting during field use when an end user applies induction or conduction heat to secure the seal to a container. If the heat activated adhesive layer melts during container sealing, it can ooze or flow out of the seal and cause a free end of the tab to be bonded to the lower seal laminate. This is called tab-grab and is undesirable. End users, in some cases, will often overheat the seal to make sure that a good heat seal is formed. The foam layer under the heat-activated adhesive layer helps protect this heat-activated adhesive layer from possible overheating during container sealing.

However, while the foam layer may be advantageous in providing better seal performance, the foam layer is a weak point in the seal structure. Due to the location of the foam layer in the lower laminate above the foil and under the tab, a stress or failure point in the prior seal is created in the foam layer upon removal via the tab. In these cases, the foam layer typically needs to withstand the removal forces experienced on the lower portions of the seal upon tab pulling. During seal removal with the tab, these forces are caused by the tab pulling upwardly on the foam layer and because the tab is partially bonded to the foam. This stress is often exaggerated when a seal is aggressively applied to a container rim due to over sealing or in some circumstances where a stronger bond to the container may be needed. In such case, the consumer is then required to apply even a greater removal force to the tab. These prior seals with foam layers have a stress or failure point where the foam layer can split internally or the bond between the foam and upper seal layers can rupture resulting in tab and/or seal failure in some cases. In many cases, and especially when the seal is over sealed or aggressively sealed to a container, the foam layer under the tab and above the foil becomes a weaker link in the overall seal structure and a stress point prone to possible failure when exposed to removal forces.

DETAILED DESCRIPTION

A pull-tab sealing member for a container is described herein containing an upper laminate having a pull-tab bonded to a lower laminate capable of being heat sealed to a container's mouth or opening. The pull-tab sealing members herein combine the advantages of an insulation or foamed polymer layer for effective heat sealing together with an overall laminate structure having a higher internal strength even with the use of the foamed polymer layer. The sealing members herein are capable of withstanding higher removal forces that tend to be inherent when the seal is aggressively sealed to a container. Such dual functionalities (insulation for better sealing and high total internal strength even with a foamed layer) are achieved in part because the sealing members herein have a laminate structure that repositions an internal stress or failure point within the seal laminate structure, upon tab removal, to a layer that provides greater total internal seal strength.

In one aspect, the sealing members herein include a pull or grip tab defined in the upper laminate portion wholly within a perimeter of the sealing member combined with an insulation layer, such as a foamed polymer layer, positioned within the upper laminate portion and tab thereof. The foamed polymer layer is selected and positioned in the laminate effective to provide insulation for heat sealing and, at the same time, relocation of the stress point (during seal removal) to a layer in a upper laminate that provides a higher maximum stress before seal rupture or failure, such as in the case of over sealing by an end user. Even with an overall laminate with much greater maximum stress before failure, the sealing members herein can also use a foamed polymer layer with much lower internal rupture forces than used in previous top-tabbed-type seals. Thus, in some cases, commodity foams and foamed polymers may be used in the seals herein. In one approach of this aspect, the foamed polymer layer is located in and/or forming part of the tab in the upper laminate and positioned above a heat-activated bonding layer securing the upper laminate and tab to the lower laminate. As discussed more below, this structural configuration helps shift the stress point in the sealing member to the heat-activated bonding layer in the upper laminate and away from the foam layer.

The heat-activated bonding layer provides an effective bond to secure the tab and upper laminate to the lower laminate. This heat-activated bonding layer is activated during manufacturing via the application of external heating through the top surface of the sealing member in a lamination process. As discussed in the background, if the prior seal used a foam insulation layer, it was positioned underneath any heat-activated adhesive layer in the lower layer of the seal; thus, it was relatively easy to apply external lamination heat from above to activate the heat-activated adhesive layer because there was no insulation above it to hinder heat transfer during lamination.

In the approach of the present disclosure, however, the foamed polymer layer is placed above the heat-activated bonding layer in the tab and upper laminate portion so that it is now in a position to interfere with the application of external lamination heating from the top during seal assembly. The sealing member structures herein, therefore, run counter to any conventional wisdom of heat management in the context of assembling a laminate with a heat-activated bonding layer. The sealing members herein, however, include an overall structure and select foamed polymer layer to provide effective heat transfer to the heat-activated bonding layer during lamination, and at the same time, the structure is still capable of providing insulation during heat sealing to a container rim so that the seal can be uniformly bonded to the rim and still be removed in one piece by grabbing the tab.

In another aspect of this disclosure, the pull-tab sealing members herein may also include a split-insulation assembly. In this approach, the sealing members may include one insulation or foamed polymer layer positioned in an upper laminate and in the tab as described above, and also a second insulation or heat redistribution layer in the lower laminate. The second insulation layer may be a foamed polymer layer or may be a non-foamed polymer layer having a select composition and density effective for providing insulation and heat-redistribution during a conduction or induction heat sealing process.

The induction and conduction functionality of the tabbed seal is retained by the sealing members herein even when the foamed polymer layer is positioned in the tab and spaced from the heat seal layers by one or more, and in some cases, up to three intervening layers. One of the intervening layers, as mentioned above, may even be the heat-activated bonding layer holding the tab to the lower laminate. In some cases, the foamed polymer layer may be spaced by about 1 to about 5 mils from a membrane layer (and heat seal layers) and, even with such spacing, the sealing members herein are still effective to provide insulation and retention of adequate heat for the heat seal layers to provide a uniform heat seal. Given the spacing between the insulation and heat seal layers, if the tab falls outside the structural and thickness parameters herein, then the tab and seal may provide unsatisfactory heat sealing, removal characteristics, and tab-grab.

For simplicity, this disclosure generally refers to a container or bottle, but the sealing members herein may be applied to any type of container, bottle, package or other apparatus having a rim or mouth surrounding an access opening to an internal cavity. In this disclosure, reference to upper and lower surfaces and layers of the components of the sealing member refers to an orientation of the components as generally depicted in figures and when the sealing member is in use with a container in an upright position and having an opening at the top of the container. Different approaches to the sealing member will first be generally described, and then more specifics of the various constructions and materials will be explained thereafter. It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from the sealing member during heating to be retained in a cap or other closure used on the container. In a two-piece construction, a wax layer, for example, may be used to temporarily bond the sealing member to a liner. Other types of releasable layers may also be used to provide a temporary bond between the seal and liner.

Figure 1:
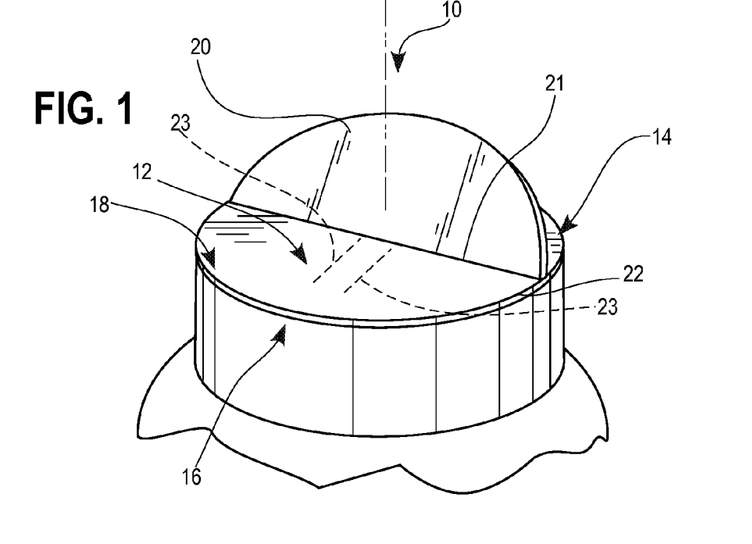
FIG. 1 is a perspective view of a tabbed sealing member.

Turning to more of the details and as generally shown in FIGS. 1-4, tabbed sealing members are shown. In FIG. 1, a tabbed sealing member 10 is provided as a laminate 12 formed from flexible sheet materials with a lower laminate portion 14 for bonding to a container's rim 16 and an upper laminate portion 18 forming a gripping tab 20 that is defined wholly within a perimeter 22 of the tabbed sealing member 10. In use, by pulling on the tab 20, a user can pivot the tab upwardly as shown in FIG. 1 and use the tab to remove the sealing member from a container rim or other container portion 16. In one approach, by pulling on the tab 20, the sealing member is removed from the container rim in one piece.

Figure 2:
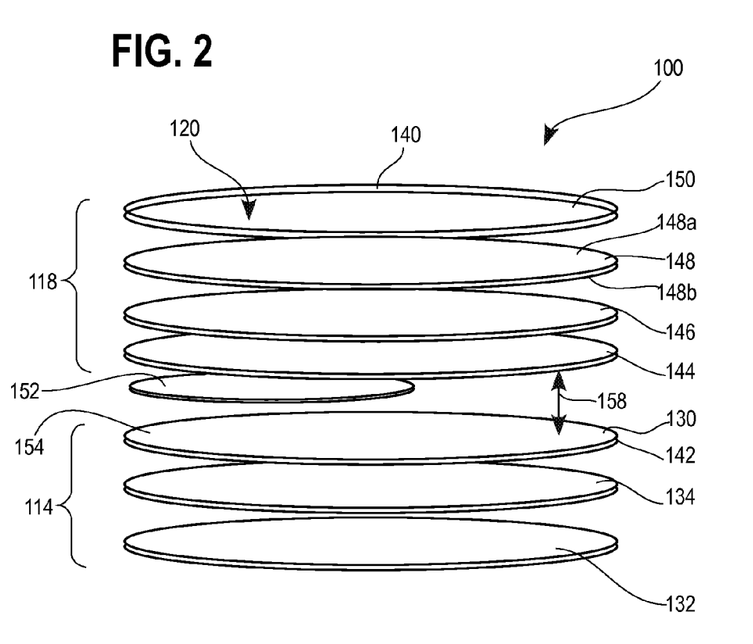
FIG. 2 is a cross-sectional view of an exemplary sealing member.

In one approach and as generally shown in the exploded cross section view of FIG. 2, a tabbed sealing member 100 having a lower seal laminate portion or lower laminate 114 and an upper seal laminate portion or upper laminate 118 is provided with a structure including an insulation or foamed polymer layer in the upper laminate portion 118 effective to provide one or more of uniform heat sealing between the tabbed and non-tabbed sides of the seal, shifting of a stress point further upwards in the seal, and/or forming a structure that can be removed in one piece upon a user pulling on the tab. The upper laminate 118 forms a tab structure 120, and the lower seal laminate 114 can be bonded or welded to a rim of a container as needed.

The lower seal laminate 114 may be a laminate or multi-layer sheet including, by one approach, a top layer 130 underneath the tab structure 120 and a lower heat sealable layer 132 effective to secure or bond the seal member to a container rim during an induction sealing or other heat sealing process. In one approach, the top layer 130 may be a membrane or induction heating layer disposed over and bonded to an upper surface of the lower heat sealable layer 132 via an intermediate polymer layer 134. The membrane or induction heating layer may be a metal foil or other induction heatable layer. Intermediate polymer layer 134 may be polyethylene terephthalate (PET), nylon, or other structural polymer layer and may be, in some approaches, about 0.5 to about 1 mil thick. Alternatively, layer 134 may be an adhesive layer securing layers 132 to layer 130. In some approaches, additional layers may also be included in the lower laminate. For instance, thin adhesive layers (not shown) may also be used to secure layers 130, 132, and 134 as needed for a particular application, and may be, for example, about 0.2 to about a 0.5 mil (or less) adhesive, such as a coated ethylene vinyl acetate (EVA), polyolefins, 2-component polyurethane, ethylene acrylic acid copolymers, curable two part urethane adhesives, epoxy adhesives, ethylene methacrylate copolymers and the like bonding materials. In the approach of FIG. 2, the lower seal laminate 114 is generally free of or generally does not include any foamed layers or polymers.

The upper laminate 118 of this approach defines the tab structure 120 and may also be a laminate or multi-layer sheet that defines or includes a pull tab or free tab 140 of the tab structure 120. By one approach, the free tab 140 is formed wholly within a circumference or perimeter 142 of the sealing member 100 or the lower seal laminate 114 as generally shown in FIG. 2. In this approach, the upper laminate 118 may include a heat-activated bonding layer 144 capable of forming a partial bond 158 between the upper laminate 118 and the lower laminate 114, which also forms the tab 140. Above the heat-activated bonding layer 144 may be a support or carrier layer 146, which may be co-extruded with the heat-activated bonding layer 144. Above the support or carrier layer 146 is a polymer foam layer 148, which may be a polyolefin or polyester foam layer. On top of the upper laminate 118 is an outer polymer support layer 150, which may be PET, nylon, or other structural-type polymer layer(s). The upper laminate 118 may also include other layers as needed for a particular application, which may be layers in between the various layers discussed herein.

In some approaches, the foamed polymer layer 148 may be bonded to the support or carrier layer 146 on one side and the upper support layer 150 on the other side. These bonds may be via thin adhesive layers (not shown in Figures) as needed for a particular approach or the layers may be composites of co-extruded films. If needed, such adhesive layers may be a coating of about 0.2 to about a 0.5 mil (or less) adhesive, such coated ethylene vinyl acetate (EVA), polyolefins, 2-component polyurethane, ethylene acrylic acid copolymers, curable two part urethane adhesives, epoxy adhesives, ethylene methacrylate copolymers and the like bonding materials.

In some approaches, there may also be a thin tie layer between the heat-activated bonding layer 144 and the carrier support layer 146 to provide enhanced bonding therebetween. By one approach, the tie layer may include ethylene methacrylate copolymers, EVA, polyolefins, 2-component polyurethane, ethylene acrylic acid copolymers, curable two-part urethane adhesives, epoxy adhesives, and the like. The tie layer may be about 0.2 to about 0.5 mil thick (or less). In other approaches, the heat-activated bonding layer and carrier support layer may be a two layer co-extruded composite film. If the tie layer is used, it may be a three layer co-extruded composite film.

The tab 140 of the tab structure 120 may also be at least partially defined via a tab stock 152 that extends only part way across the surface of the seal. More specifically, the tab stock 152 is a partial layer that extends part-way across the length of the lower laminate 114. Tab stock 152 forms the tab 140 because it bonds to the heat-activated bonding layer 144 and generally prevents layer 144 (and the layers above) from adhering to an upper surface 154 of the lower seal laminate 114 across at least a portion thereof as generally shown in FIGS. 1 and 2. That is, a top surface of the tab stock 152 is adhered to a lower portion of the heat-activated bonding layer 144. A bottom surface of tab stock 152 is adjacent to, but not bonded to, the upper surface 154 of the lower laminate 114 to form the tab 140. While the relative dimensions of the tab stock 152 are not particularly limited, in some cases the tab stock 152 lies wholly within a circumference or perimeter 142 of the seal 100 and/or lower laminate 114 and, typically, the tab stock 152 occupies about 25 to about 50 percent of surface area of the sealing member 100. In one aspect, the tab stock 152 is formed of polyester, such as polyethylene terephthalate (PET), or paper. By one optional approach, a lower surface of the tab stock 152 may be coated with a release material, for example silicone. The optional release coating minimizes the possibility that the tab stock 152 will become adhered to the upper surface 154 of the lower laminate 114 during the heat sealing or induction heat sealing process. However, such release coatings are not typically necessary. As generally shown in at least FIG. 1, the tab stock 152 permits the tab structure 120 (or 20) to pivot or hinge upwardly along a boundary line 21 to form the tab 120 (or 20). By this approach, the tab stock 152 and formed tab 140 are defined wholly within a circumference or perimeter 142 (or 22) of the seal.

While not wishing to be limited by theory, the tabbed sealing member 100 having the foamed polymer layer 148 in the upper laminate 118 and forming part of the tab structure 120 provides an improved sealing member because it shifts the failure point of the seal away from the foamed layer in the lower laminate (as in the prior tabbed seals) to the heat-activated bonding layer 144 in the upper laminate. In some approaches, the failure or rupture point of the total sealing member 100 is about 4000 to about 6500 g/in where the heat-activated bonding layer 144, upon failure, internally separates in or adjacent to the partial bond 158 that is partially bonded to the lower laminate 114 and the remaining layers of the seal remain bonded together These high seal strengths are even obtained with the use of the foamed polymer layer 148 that has a lower internal strength than the heat-activated bonding layer. For instance and in one approach, this high level of internal strength in the sealing member 100 can be achieved when using low density, commodity polyolefin or polymer foams for the foamed polymer layer 148. Suitable foamed layers include polypropylene, low density polyethylene, and polyester foams. These foams generally have a much lower internal rupture strength of about 2000 to about 3500 g/in. In some approaches, the foamed polymer layer 148 may also have a density less than 0.6 g/cc and, in some cases, about 0.4 to less than about 0.6 g/cc. In other approaches, the density may be from about 0.4 g/cc to about 0.9 g/cc. Thus, even with the internally weaker foamed layers, the structure of the seals herein generally achieve a relatively high internal strength in the context of tabbed sealing members mentioned above.

Among other factors, the high internal strength of the sealing member 100 and the upper laminate 118 (even when using commodity foams) may be due, at least in part, because the foamed polymer layer 148 is bonded to and has structural support across its entire upper and lower surfaces 148a and 148b and due to its positioning in the laminate. The foamed polymer layer 148 is in the upper laminate 118 and it shifts the stress point (upon tab pulling) away from the foam layer to the heat-activated bonding layer 144 and the partial bond 158 of the upper laminate 118 to the lower laminate 114. Thus, sealing member 100 provides the dual benefit of including an internally weaker foamed polymer layer to aid in achieving uniform heat sealing of the lower heat seal layer to a container rim and, at the same time, an overall stronger laminate even with the foamed polymer layer. As discussed more below, due to the position of the foamed polymer layer 148 above the heat-activated bonding layer 144, the foam is in a position to interfere with heat transfer to the layer 144 during seal assembly via lamination. Thus, the upper laminate 114 and foam thereof may also include selected properties and relative compositions in order to ensure that sufficient lamination heating can be transferred downwardly therethrough in order to reach the heat-activated bonding layer 144 during seal assembly. Insufficient lamination heating would lead to a poor bond of the heat-activated bonding layer 144 to the lower laminate 144 and defeat the purpose of the sealing members herein because layer 144 would not achieve a proper bond to the lower laminate.

To achieve the multiple functionalities described above, the upper laminate 118 includes, among other features, the foamed polymer layer 148 (and the lower laminate 114 is generally devoid or free of such layers in one approach) and the upper laminate 118 also has a minimized total thickness that includes, at most, about 50 to about 70 percent of its thickness being the foamed polymer layer 148. In addition, the upper laminate 118 (and tab thereof) may have select ratios of its total thickness (exclusive of any tab stock and any optional adhesive layers) to a thickness of the carrier layer 146 and to the thickness of the heat activated bonding layer 144. The ratios are effective to achieve an upper laminate with the foamed polymer layer that provides the needed insulation for the heat sealing to a container, and the ratios permit a foamed layer thin enough to permit adequate lamination heating downwardly therethrough to form a strong bond between the heat-activated bonding layer 144 and the lower laminate 114 in order to realize the heightened laminate strengths in a seal that is as thin as possible. Because the foamed polymer layer 148 is above the heat-activated bonding 144 and, thus, does not protect the bonding layer 144 from induction heat or other heat from the heat sealing operation, the ratios and thicknesses of the foamed polymer layer 148, carrier layer 146, as well as the heat-activated bonding layer 144 are selected to achieve the desired bond between the upper and lower laminate and to maintain the integrity of the tab during the lamination, heating, and sealing operations.

In some cases, the total thickness of the upper laminate 118 and/or tab structure 120 is only about 3 to about 7 mils (in some cases, about 3 to about 6 mils). As considered herein, the total thickness is exclusive of the tab stock and any optional adhesive layers bonding the various layers of the upper laminate together. By one approach, an effective ratio of this total thickness of the upper laminate 118 and/or tab structure 120 to a thickness of the support or carrier layer 146 is about 1:0.1 to about 1:0.25 when combined with the foamed polymer 148 that is about 50 to about 70 percent of the tab thickness. (In other approaches, effective ratios may be about 1:0.15 to about 1:0.25 and, in yet other approaches, about 1:0.15 to about 1:0.20.) By another approach, an effective ratio of the total thickness of the upper laminate 118 and/or tab structure 120 to a total thickness of the heat-activated bonding layer 144 is about 1:0.15 to about 1:0.25 when combined with the foamed polymer layer 148 that is about 50 to about 70 percent of the tab total thickness. The combination of these ratios are effective such that the upper laminate 118 has a minimized construction and thickness (even with a thick insulation layer) to provide adequate heat transfer for lamination and to provide adequate insulation effective for bonding the heat sealable layer 132 to a container rim. The structure of the upper laminate 118 described herein generally consists of down gauging or a much thinner construction of the polymer foamed layers than previously thought possible in a tabbed sealing member. By one approach, the foamed polymer layer 148 may be only about 2 to about 5 mils thick. In other approaches, about 2 to about 4.5 mils thick, and, in yet other approaches, about 2 to about 3 mils thick. Even with the insulation layer 148 positioned above the bonding layer 144, the bonding layer 144 is effective to achieve the desired bonds without oozing and flowing during later container sealing. While not wishing to be limited by theory, it is believed this may be due, in part, to the positioning of layers in the structure and/or the selected ratios of layer thicknesses in the tab structure 120 and upper laminate 118.

With the foamed polymer layer 148 in the upper laminate, it also tends to impart an increased surface roughness to the top of the sealing member 100. By one approach, the upper support layer 150 may be a relatively thin layer, such as about a 0.5 to about a 1 mil thick layer of PET. The foamed polymer layer has a grain or surface roughness on its top surface 148a thereof due to the foaming and voids therein. This grain or surface roughness of the foam imparts a grain or surface roughness to the outer layer 150 that is not normally found in a typical polymer layer such as PET or the like. This is also due to the selected thinness of layer 150. By one approach, the surface roughness of the outer polymer layer 150 may correspond or be associated with the surface roughness of layer 148, which is achieved from the foamed layer 148 underneath. In one approach, the upper support layer 150 is untextured, but has a surface roughness imparted to an upper outer surface thereof from the surface roughness of the foamed polymer layer 148. This grain or surface roughness, in some approaches, tends to reduce the surface contact between the outer layer 150 and any liner or cap applied over the sealing member 100. This grain or surface roughness tends to result in a reduction in removal force of a cap or adjacent liner (in a two-piece seal) in view of the decreased surface contact between the outer layer 150 and any adjacent surface cap or liner surface. In general, the surface roughness of layer 150 goes up as the density of layer 148 decreases.

Figure 3:
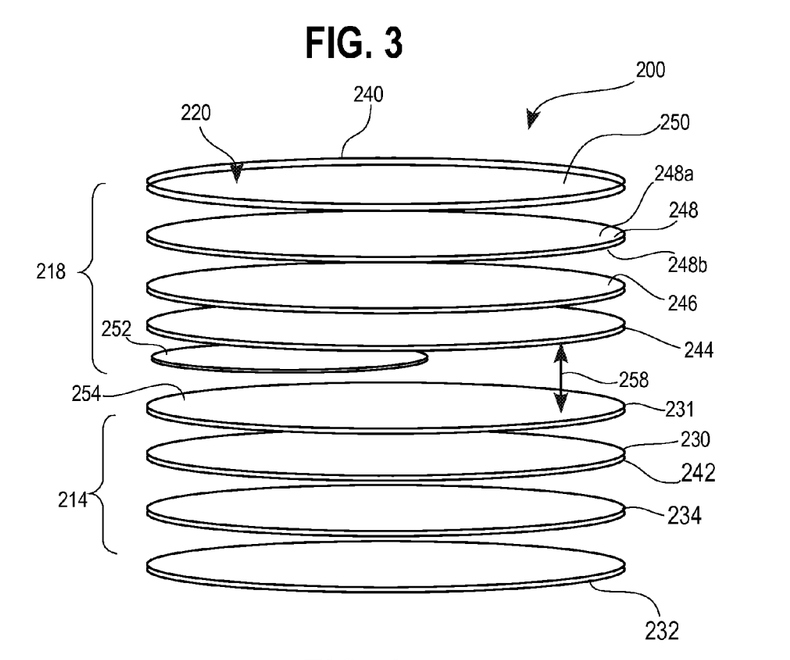
FIG. 3 is a cross-sectional view of another exemplary sealing member.

Turning now to FIG. 3, a tabbed sealing member 200 is shown including a split insulation assembly. The sealing member 200 includes a foamed polymer layer in both the upper laminate 218 and lower laminate 214. The various layers of sealing member 200 are generally similar to sealing member 100, which are illustrated with common reference numbers (i.e., 218 corresponds to 118 and so forth). It will be appreciated that the descriptions noted above with respect to sealing member 100 apply equally to the counterpart components in sealing member 200. Differences between the sealing members will be described further.

Sealing member 200 includes an additional, thin foamed polymer layer 231 in the lower laminate 214. In one approach, the thin foamed polymer layer 231 is positioned as the top layer in the lower laminate 214 and the heat activated bonding layer 244 forms at least a partial bond 258 to the thin foamed polymer layer 231.

In this approach, the thin foamed polymer layer 231 may have a thickness of about 2 to about 5 mils (in other approaches about 2 to about 4 mils, and in yet other approaches, about 2 to about 3 mils) and, in some approaches, may have a higher density than the polymer foamed layer 248 in the upper laminate. In some approaches, the density of the foamed polymer layer 231 in the lower laminate may be about 0.6 to about 0.9 g/cc (in other approaches, about 0.7 to about 0.9 g/cc). This foamed layer may also be a blend of a higher density polymer and a lower density polymer in order to increase its internal strength. In some approaches, this foamed layer may include about 50 to about 70 percent high density polymer (such as high density polyethylene, and the like) and about 30 to about 50 percent of a low density polymer (such as a low density polyethylene and the like).

In this approach, the split foamed polymer assembly affords additional advantages to the sealing member 200. The insulation is split whereby, in some approaches, about 50 to about 75 percent of the insulation is provided in the upper laminate 218 and about 25 to about 50 percent of the insulation is provided in the lower laminate 214.

Figure 4:
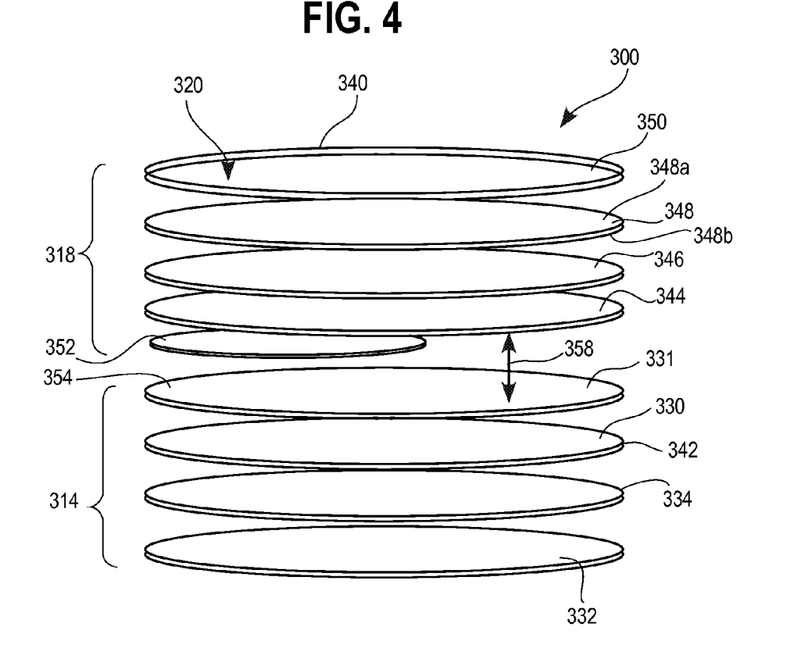
FIG. 4 is a cross-sectional view of another exemplary sealing member.

Turning now to FIG. 4, a tabbed sealing member 300 is shown also including a split insulation assembly. In this approach, the sealing member 300 includes a foamed polymer layer in the upper laminate 318 and a heat distributing non-foam polymer layer in the lower laminate 314. As with the version of FIG. 3, the various layers of sealing member 300 are generally similar to sealing member 100 and sealing member 200, which are illustrated with common reference numbers (i.e., 318 corresponds to 218 and to 118 and so forth). It will be appreciated that the descriptions noted above with respect to sealing member 100 and 200 apply equally to the counterpart components in sealing member 200. Differences between the sealing members will be described further.

Sealing member 300 includes an additional, thin non-foamed heat distribution layer 331 in the lower laminate 314. In one approach of this version of the seal, the non-foamed heat distribution layer 331 is positioned as the top layer in the lower laminate 314 and the heat activated bonding layer 344 forms at least a partial bond 358 to the non-foamed heat distribution layer 331.

The non-foam heat distributing layer 331 may be a non-foam heat distributing polyolefin film layer. By one approach, the non-foam heat distributing polyolefin film layer is a blend of polyolefin materials, such as a blend of one or more high density polyolefin components combined with one or more lower density polyolefin components. Suitable polymers include but are not limited to, polyethylene, polypropylene, ethylene-propylene copolymers, blends thereof as well as copolymers or blends with higher alpha-olefins. By one approach, the non-foam heat distributing polyolefin film layer is a blend of about 50 to about 70 percent of one or more high density polyolefin materials with the remainder being one or more lower density polyolefin materials. The blend is selected to achieve effective densities to provide both heat sealing to the container as well as separation of the liner from the seal in one piece.

By one approach, effective densities of the non-foam heat distributing polyolefin layer 331 may be between about 0.96 g/cc to about 0.99 g/cc. Above or below this density range, unacceptable results are obtained because the layer provides too much insulation or does not effectively distribute heat. By another approach, the non-foam heat distributing layer is a blend of about 50 to about 70 percent high density polyethylene combined with low to medium density polyethylene effective to achieve the density ranges described above.

In addition, effective thicknesses of the non-foam heat distributing layer are selected to achieve such performance in combination with the density. One approach of an effective thickness may be about 2 to about 10 mils. In other approaches, layer 331 may be about 2 to about 5 mils thick, in other approaches, about 2 to about 4 mils thick, and in yet other approaches, about 2 to about 3 mils thick. Thicknesses outside this range were unacceptable because the layer does not provide enough insulation or does not effectively distribute heat as needed to achieve the dual performance characteristics of liner separation and seal member bonding.

Now that the basic structures of sealing members 10, 100, 200, and 300 are described, further details about the various layers and components of the sealing members are described in more detail.

Suitable adhesives, hot melt adhesives, or sealants for the heat sealable layer 132, 232, and 332 include, but are not limited to, polyesters, polyolefins, ethylene vinyl acetate, ethylene-acrylic acid copolymers, surlyn, and other suitable materials. By one approach, the heat sealable layer may be a single layer or a multi-layer structure of such materials about 0.2 to about 3 mils thick. By some approaches, the heat seal layer is selected to have a composition similar to and/or include the same polymer type as the composition of the container. For instance, if the container contains polyethylene, then the heat seal layer would also container polyethylene. If the container contains polypropylene, then the heat seal layer would container polypropylene. Other similar materials combinations are also possible.

By one approach, the top layer 130, 230, and 330 may be one or more layers configured to provide induction heating and barrier characteristics to the seal. A layer configured to provide induction heating is any layer capable of generating heat upon being exposed to an induction current where eddy currents in the layer generate heat. By one approach, the membrane layer may be a metal layer, such as, aluminum foil, tin, and the like. In other approaches, the membrane layer may be a polymer layer in combination with an induction heating layer. The membrane layer may also be or include an atmospheric barrier layer capable of retarding the migration of gases and moisture at least from outside to inside a sealed container and, in some cases, also provide induction heating at the same time. Thus, the membrane layer may be one or more layers configured to provide such functionalities. By one approach, the membrane layer is about 0.3 to about 2 mils of a metal foil, such as aluminum foil, which is capable of providing induction heating and to function as an atmospheric barrier.

The adhesives useful for any of the optional adhesive layers described herein include, for example, ethylene vinyl acetate (EVA), polyolefins, 2-component polyurethane, ethylene acrylic acid copolymers, curable two part urethane adhesives, epoxy adhesives, ethylene methacrylate copolymers and the like bonding materials. Other suitable materials may include low density polyethylene, ethylene-acrylic acid copolymers and ethylene methacrylate copolymers. By one approach, any optional adhesive layers may be a coated polyolefin adhesive layer.

The heat-activated bonding layer 144, 244, and 344 may include any polymer materials that are heat activated to achieve its bonding characteristics. By one approach, the heat-activated bonding layer may have a density of about 0.9 to about 1.0 g/cc and a peak melting point of about 145° F. to about 155° F. A melt index of the bonding layer 144, 244, and 344 may be about 20 to about 30 g/10 min (ASTM D1238). Suitable examples include ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials.

By one approach, the heat-activated bonding layer 144 is EVA. In general, EVA is effective for the heat-activated bonding layer because of its thermal bonding characteristics, such that it readily bonds to layer 130, 231, or 331 and forms a bond thereto greater than the internal rupture strength mentioned above. By one approach, the heat-activated bonding layer may have a vinyl acetate content of about 20 to about 28 percent with the remaining monomer being ethylene in order to achieve the bond strengths and, in some cases, the internal rupture strengths to provide the improved seals herein. A vinyl acetate content lower than 20 percent is insufficient to form the robust structures described herein. As described above, the heat-activated bonding layer may have a selected thickness relative to the total thickness of the upper laminate to help achieve functionality of the seal. If the heat-activated bonding layer is too thick when the foamed polymer layer is positioned above it, it becomes difficult to achieve satisfactory bonds and there is too much volume or mass of the heat-activated bonding layer that tends to ooze out from the seal upon later induction or conduction heating. If the heat-activated bonding layer is too thin, the bond strengths to the lower laminate can be inadequate resulting in the tab peeling away from the lower laminate upon seal removal. If the bonding layer is too thin, then the tab also does not have the sufficient internal strength to prevent tearing. By one approach, bonding layer may be about 0.5 to about 1.5 mil of EVA and, in other approaches, about 0.5 to about 1.0 mils of EVA; however, the thickness can vary as needed for a particular application to achieve the desired bonds and internal strength.

When the foamed polymer layer 148, 248, and 348 is positioned above the heat activated bonding layer 148 (and not under the bonding layer), the foamed polymer layer is not in a position to protect the heat sensitive bonding layer (such as an EVA layer) from the heat generated during induction or conduction heat sealing. Thus, selection of the size and volume of material for the heat-activated bonding layer 148 helps to achieve the bonds described herein as well as to minimize and prevent oozing of this material and tab-grab. By one approach, the heat-activated bonding layer may include about 10 to about 250 mm$^3$ of material, such as EVA. In other approaches, the bonding layer may include about 10 to about 32 mm$^3$ of material, like EVA (such as with a 30 to 35 mm diameter seal) and in yet other approaches, about 80 to about 250 mm$^3$ of material, such as EVA (such as with a 80 to 100 mm diameter seal). Such volume of material is effective to achieve the desired bonds and minimize and prevent flowing and oozing during heat seal when the insulation layer 40 is above this layer.

The support layers 146, 246, and 346 can be selected from a variety of suitable non-foamed polymer materials that are capable of providing structural support at a relatively thin thickness. For example, the polymer materials may be uni-axially oriented polymers or bi-axially oriented polymers, such as uni-axially oriented polypropylene and bi-axially oriented polypropylene. The support layers may also be PET, nylon, and other structural polymers. The support layers may also be copolymers and/or blown film layers. By one approach, the support layer may be oriented in a cross-web direction only. In some approaches, these axially oriented polymers may have a modulus of elasticity in a longitudinal direction of greater than about 2,000 N/mm$^2$. In other cases, the film may have a modulus of elasticity in a cross-direction of about 4,000 N/mm$^2$ or greater. Some films may be bi-axially oriented and have both the longitudinal and cross-web modulus of elasticity mentioned above. The carrier or support layer may be a co-extruded layer with the heat-activated bonding layer. The carrier or support layer may be about 2 to about 5 mils thick. The support layer 146 provides structural support for the foamed polymer layer 148 over its entire lower surface.

When using the uni-axially oriented polymer, it is desired in some approaches that the orientation (generally shown as lines 23 in FIG. 1) of the polymer layer is positioned transverse to the hinge line 21 (FIG. 1) in order to impart enhanced structure support to the upper laminate and overall seal structure. By one approach, the oriented polymer may be a monolayer oriented polypropylene. In some cases, a co-extruded or multi-layer oriented polypropylene resulted in a failure point within the carrier layer and a generally lower strength seal.

The various layers of the sealing member are assembled via a heat lamination process forming a sheet of the described layers. Adhesive coating and/or extrusion lamination may also be used. During lamination, heating is applied to the web in order to activate the various heat-activated layers in the laminate structure in order to form the sealing member. The resulting laminate sheet of the sealing members 10, 100, 200, and 300 can be cut into appropriate sized disks or other shapes as needed to form a vessel closing assembly or tabbed sealing member. The cut sealing member is inserted into a cap or other closure which, in turn, is applied to the neck of a container to be sealed. The screw cap can be screwed onto the open neck of the container, thus sandwiching the sealing member between the open neck of the container and the top of the cap. Heat or induction current or other sealing is then applied to seal the bottom subassembly of layers forming the seal portion to the neck of the container.

The following example is included to illustrate the disclosure herein and not to limit it. Unless otherwise stated herein, all parts and percentages are by weight.

EXAMPLE

A test was completed to compare the failure point and maximum stress to failure of a prior tabbed sealing member having a foamed polymer layer as the top layer in a lower laminate compared to a similar tabbed sealing member without a foamed polymer in the lower laminate. In each case, EVA was the heat-activated bonding layer used to bond the upper laminate to the lower laminate.

Figure 5:
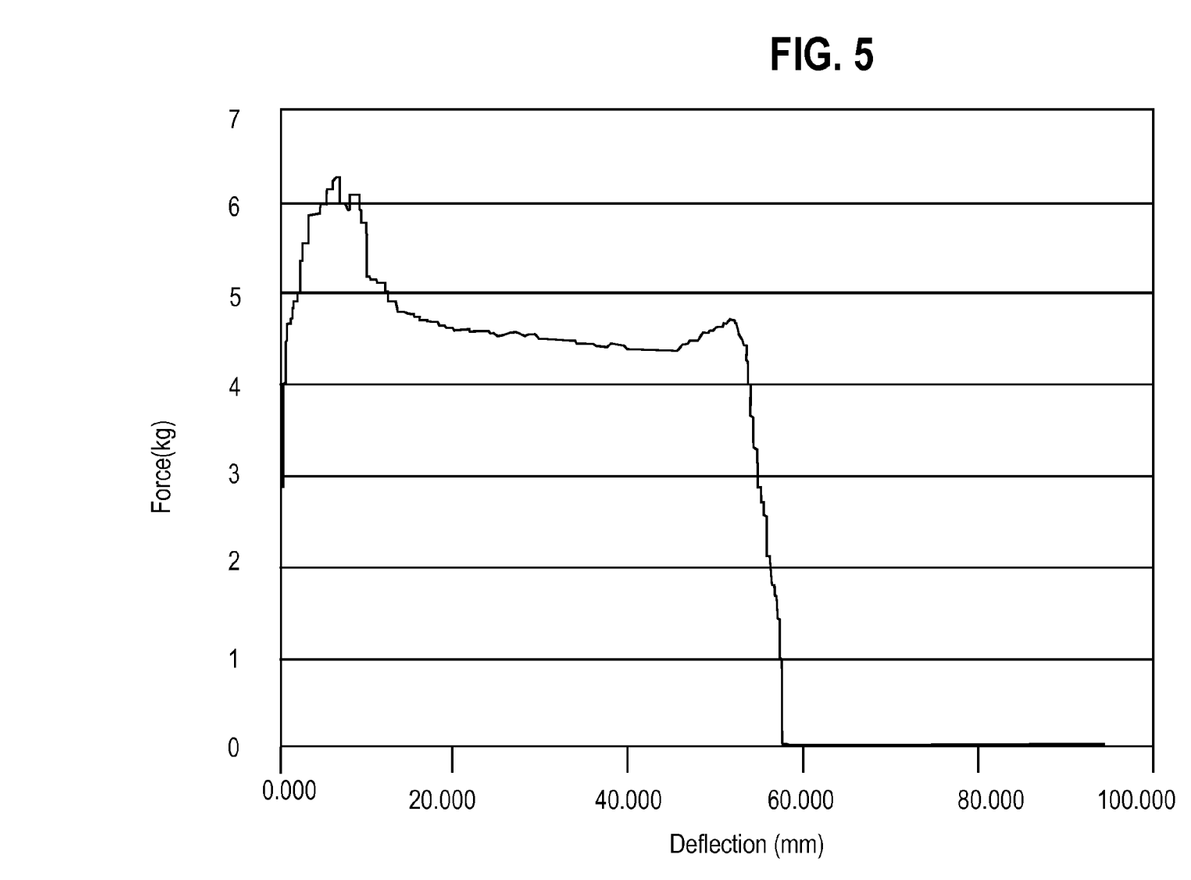
FIGS. 5 and 6 are graphs of internal seal strength.
Figure 6:
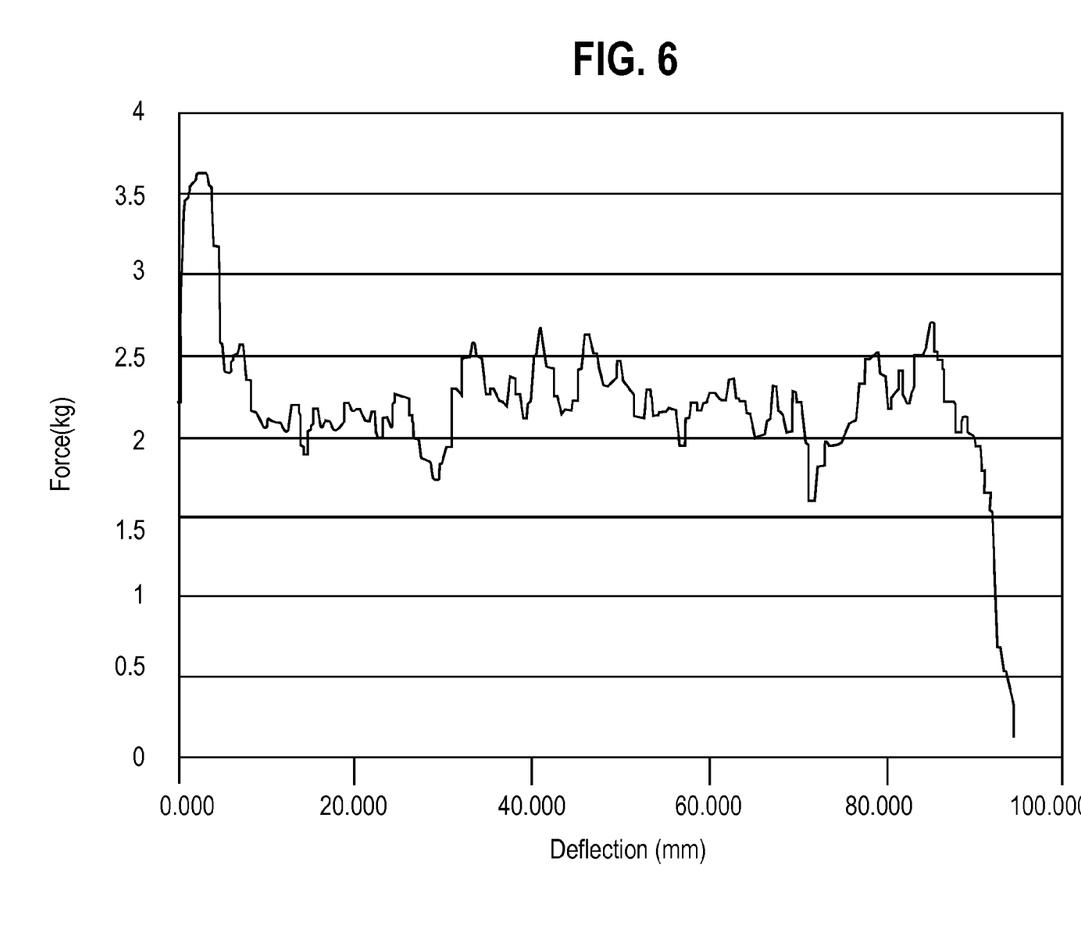

A Chatillon TCD 200 Force Gauge Tester was used to measure the internal stress and rupture point with about 1 inch wide strips. The comparison prior tabbed sealing member having a foamed polymer layer as the top layer in the lower laminate had a maximum internal strength of about 3.5 kg/in where the foam layer itself started to separate internally. The other sample, on the other hand, which did not include a foamed layer in the lower laminate demonstrated a much higher internal strength of about 6 kg/in where the EVA bonding layer itself started to separate and tear internally where the other layers of the seal remained bonded together. Thus, a laminate having EVA bonded to a lower laminate portion without a foamed layer shifted the failure point of the overall seal from the top layer of the lower laminate (i.e., foam in the prior seal) to the heat-activated bonding layer. This shifting of the failure point provided almost a two-fold increase in the overall internal bond strength of the seal. Test results are shown graphically in FIG. 5 (foam in lower laminate representing prior sealing members) and FIG. 6 (no foam in lower laminate).

It will be understood that various changes in the details, materials, and arrangements of the process, liner, seal, and combinations thereof, which have been herein described and illustrated in order to explain the nature of the products and methods may be made by those skilled in the art within the principle and scope of the embodied product as expressed in the appended claims. For example, the seals may include other layers within the laminate as needed for a particular application. Adhesive layers not shown in the Figures may also be used, if needed, to secure various layers together.

What is claimed is:

1. A tabbed sealing member for sealing to a rim of a container, the tabbed sealing member comprising:
   a lower laminate including a bottom heat sealable layer configured for heat sealing the tabbed sealing member to the rim of the container;
   an upper laminate at least partially bonded to the lower laminate to form a gripping tab defined within a perimeter of the lower laminate;
   a heat-activated bonding layer forming the at least partial bond between the upper laminate and the lower laminate;
   a foamed polymer layer in the upper laminate above the heat-activated bonding layer and forming part of the gripping tab, the foamed polymer layer in the upper laminate arranged and configured to permit heating therethrough sufficient to activate the heat-activated bonding layer below it for bonding the upper laminate to the lower laminate, and the foamed polymer layer in the upper laminate effective to retain heat in the lower laminate sufficient to form a bond between the bottom heat sealable layer and the container rim so that the tabbed sealing member can be removed from the container in one piece;
   wherein the foamed polymer layer in the upper laminate has a density of about 0.4 to about 0.9 g/cc and a rupture strength of less than about 3200 g/in; and
   wherein a layer of oriented polyolefin is between the heat-activated bonding layer and the foamed polymer layer in the upper laminate, the layer of oriented polyolefin forming part of the gripping tab.

2. The tabbed sealing member of claim 1, wherein the layer of oriented polyolefin is oriented in a cross-web direction and the orientation is transverse to a hinge line forming the gripping tab in the tabbed sealing member.

3. The tabbed sealing member of claim 1, wherein the position of the foamed polymer layer in the upper laminate forms a rupture point within the heat-activated bonding layer of between about 4,000 to about 6,500 g/in whereupon in the event of a failure, the seal separates internally to the heat-activated bonding layer with the other layers above and below the heat-activated bonding layer remaining bonded together.

4. The tabbed sealing member of claim 1, wherein the foamed polymer layer in the upper laminate is about 2 to about 5 mils thick.

5. The tabbed sealing member of claim 1, wherein the foamed polymer layer in the upper laminate is selected from the group consisting of foamed polypropylene and foamed polyester.

6. The tabbed sealing member of claim 1, wherein the heat-activated bonding layer is selected from the group consisting of ethylene vinyl acetate, polyolefins, 2-component polyurethane, ethylene acrylic acid copolymers, curable two-part urethane adhesives, epoxy adhesives, and ethylene methacrylate copolymers.

7. The tabbed sealing member of claim 1, further comprising a tab stock positioned between the upper laminate and the lower laminate and extending partially therebetween, the tab stock bonded to the upper laminate by the heat-activated bonding layer but not bonded to the lower laminate to form the gripping tab.

8. The tabbed sealing member of claim 1, wherein the lower laminate includes a metal foil layer configured to provide induction heating to the bottom heat sealable layer.

9. The tabbed sealing member of claim 1, wherein the lower laminate is free of foamed polymer layers.

10. A tabbed sealing member for sealing to a rim of a container, the tabbed sealing member comprising:
    a lower laminate including a bottom heat sealable layer configured for heat sealing the tabbed sealing member to the rim of the container;
    an upper laminate at least partially bonded to the lower laminate to form a gripping tab defined within a perimeter of the lower laminate;
    a heat-activated bonding layer forming the at least partial bond between the upper laminate and the lower laminate;
    a foamed polymer layer in the upper laminate above the heat-activated bonding layer and forming part of the gripping tab, the foamed polymer layer in the upper laminate arranged and configured to permit heating therethrough sufficient to activate the heat-activated bonding layer below it for bonding the upper laminate to the lower laminate, and the foamed polymer layer in the upper laminate effective to retain heat in the lower laminate sufficient to form a bond between the heat sealable layer and the container rim so that the tabbed sealing member can be removed from the container in one piece;
    wherein the foamed polymer layer in the upper laminate has a density of about 0.4 to about 0.9 g/cc and a rupture strength of less than about 3200 g/in;
    wherein the position of the foamed polymer layer in the upper laminate forms a rupture point within the heat-activated bonding layer of between about 4,000 to about 6,500 g/in whereupon in the event of a failure, the seal separates internally to the heat-activated bonding layer with the other layers above and below the heat-activated bonding layer remaining bonded together; and wherein a layer of oriented polyolefin is between the heat-activated bonding layer and the foamed polymer layer in the upper laminate, the layer of oriented polyolefin forming part of the gripping tab.

11. The tabbed sealing member of claim 10, wherein the lower laminate is free of foamed polymers.

* * * * *